US008272878B2

(12) United States Patent
Neumetzler

(10) Patent No.: US 8,272,878 B2
(45) Date of Patent: Sep. 25, 2012

(54) DISTRIBUTOR CONNECTION MODULE FOR TELECOMMUNICATION AND DATA TECHNOLOGY

(75) Inventor: Heiko Neumetzler, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 13/054,383

(22) PCT Filed: Jun. 15, 2009

(86) PCT No.: PCT/EP2009/004286
§ 371 (c)(1),
(2), (4) Date: Apr. 7, 2011

(87) PCT Pub. No.: WO2010/006673
PCT Pub. Date: Jan. 21, 2010

(65) Prior Publication Data
US 2011/0207341 A1 Aug. 25, 2011

(30) Foreign Application Priority Data
Jul. 16, 2008 (DE) .......................... 10 2008 033 430

(51) Int. Cl.
H01R 12/00 (2006.01)

(52) U.S. Cl. ........................................................ 439/61

(58) Field of Classification Search .................... 439/61, 439/719, 849, 884, 108, 469, 404, 408, 406, 439/409, 92, 95, 855, 857, 755–800, 869–875, 439/885, 891; 361/729, 730, 800, 799
See application file for complete search history.

(56) References Cited

U.S. PATENT DOCUMENTS
3,668,476 A * 6/1972 Wrabel et al. ................ 361/785
(Continued)

FOREIGN PATENT DOCUMENTS
DE 100 29 649 1/2002
(Continued)

OTHER PUBLICATIONS
International Search Report from PCT/EP2009/004286 dated Apr. 28, 2010 (Form PCT/ISA/210).

Primary Examiner — Edwin A. Leon
Assistant Examiner — Harshad Patel
(74) Attorney, Agent, or Firm — Merchant & Gould P.C.

(57) ABSTRACT

The invention relates to a distribution board connection module (1) for telecommunications and data technology, comprising a trough (2) which is in the form of a U in cross section, the trough (2) being made from metal or metalized plastic and having a base plate (3) and two limbs (4), the base plate (3) having openings, into which first printed circuit board plug-type connectors (5) are inserted, the modules (10) each having a plastic housing, which has a cavity, in which at least one printed circuit board (21) is arranged, the plastic housing having, on its front end side (13, 14), an opening in which at least one printed circuit board plug-type connector (22) is arranged and having, on its rear end side (15, 16), an opening, the modules (10) being plugged onto the limbs (4) of the trough (2) and a printed circuit board plug-type connector (5), which is inserted into the base plate (3) of the trough (2), engaging in the opening of the rear end side (15, 16) of a plugged-on module and making contact with the printed circuit board of the module (10), and to a grounding clip (30) for a module.

10 Claims, 9 Drawing Sheets

U.S. PATENT DOCUMENTS

| | | |
|---|---|---|
| 4,561,712 A | 12/1985 | Borne et al. |
| 5,322,445 A * | 6/1994 | Ozaki et al. ............. 439/212 |
| 5,695,361 A * | 12/1997 | Elisei ............. 439/535 |
| 6,741,463 B1 * | 5/2004 | Akhtar et al. ............. 361/679.41 |
| 7,008,243 B2 | 3/2006 | Mueller et al. |
| 7,037,118 B2 * | 5/2006 | Neumetzler et al. ......... 439/76.1 |
| 7,090,512 B2 * | 8/2006 | Laub et al. ............. 439/79 |
| 7,230,833 B1 | 6/2007 | Sickels |
| 7,407,389 B2 | 8/2008 | Busse et al. |
| 7,410,369 B2 | 8/2008 | Busse et al. |
| 7,710,733 B2 | 5/2010 | Neumetzler et al. |
| 7,717,732 B2 | 5/2010 | Busse et al. |
| 7,811,107 B2 | 10/2010 | Stockel |
| 2008/0285240 A1 | 11/2008 | Klein et al. |
| 2010/0099308 A1 | 4/2010 | Busse |

FOREIGN PATENT DOCUMENTS

| | | |
|---|---|---|
| DE | 101 50 045 | 4/2003 |
| DE | 102 57 308 | 7/2004 |
| DE | 103 39 844 | 1/2005 |
| DE | 103 41 694 | 2/2005 |
| DE | 10 2004 043 764 | 2/2006 |
| DE | 10 2007 003 250 | 6/2008 |
| EP | 1 005 235 | 5/2000 |
| WO | WO 2006/048221 | 5/2006 |
| WO | WO 2007/039033 | 4/2007 |

\* cited by examiner

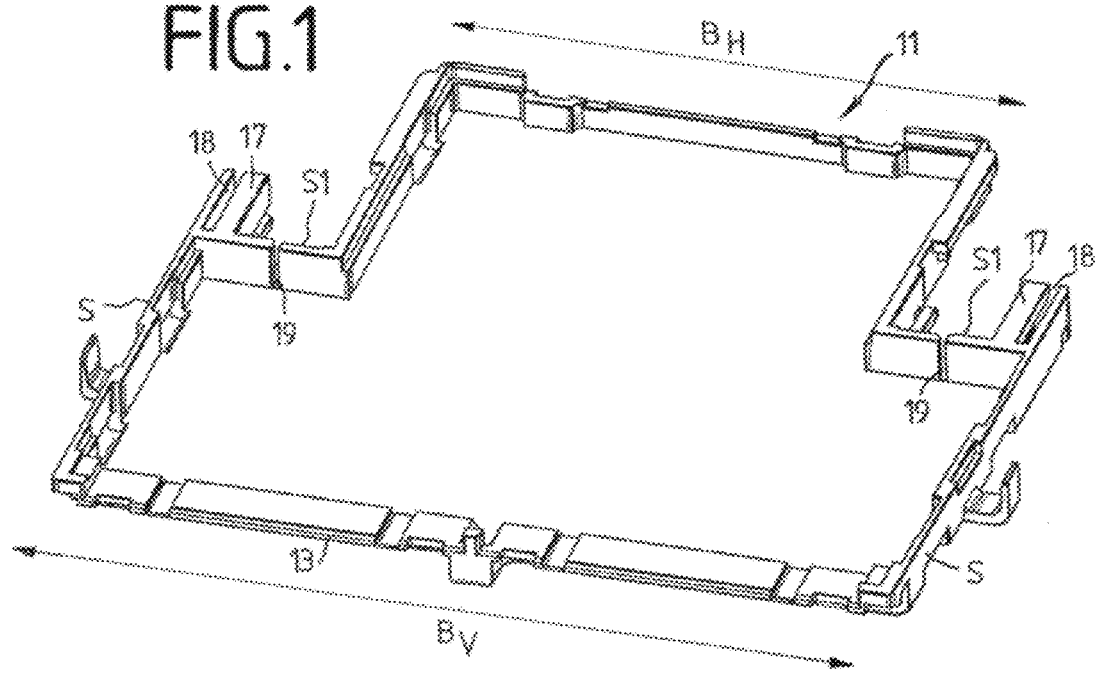
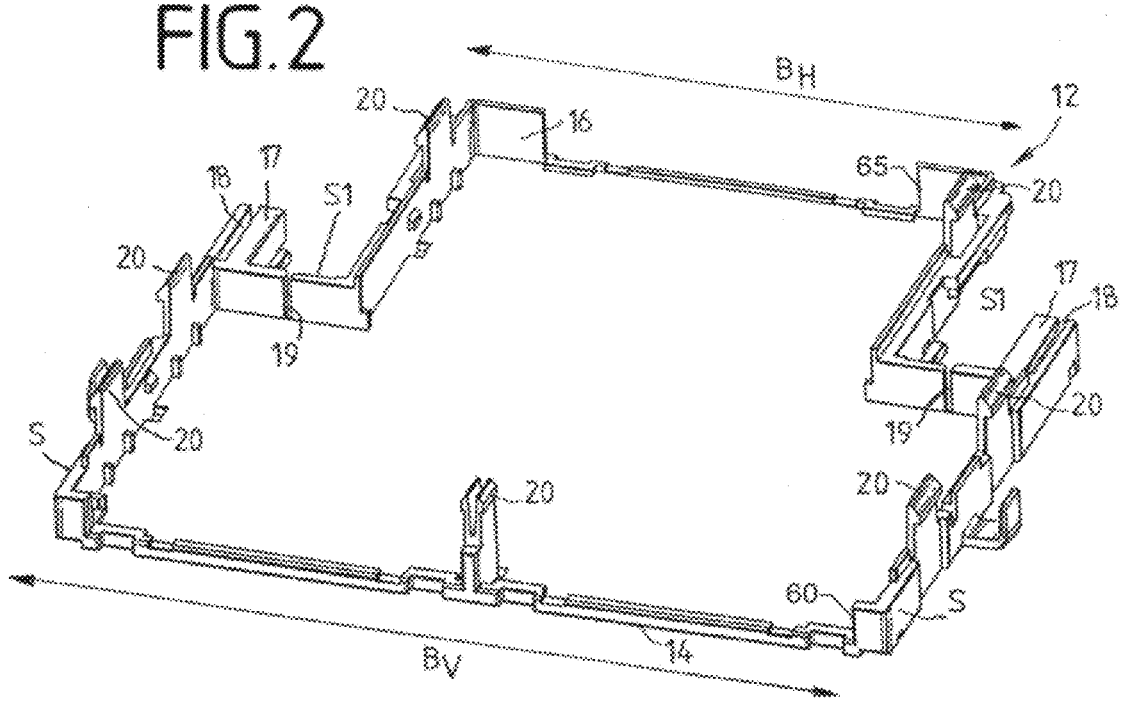

DISTRIBUTOR CONNECTION MODULE FOR TELECOMMUNICATION AND DATA TECHNOLOGY

This application is a National Stage Application of PCT/EP2009/004286, filed 15 Jun. 2009, which claims benefit of Serial No. 10 2008 033 430.8, filed 16 Jul. 2008 in Germany and which application(s) are incorporated herein by reference. To the extent appropriate, a claim of priority is made to each of the above disclosed applications.

BACKGROUND

The invention relates to a distribution board connection module for telecommunications and data technology and to a grounding clip for modules.

DE 103 39 844 B3 has disclosed a distribution board connection module for telecommunications and data technology, comprising a housing, in which input and output contacts for contacting lines and wires are arranged in such a way that they are accessible from the outside, the housing being formed with a cavity, in which at least one printed circuit board is arranged, the input and output contacts being arranged on the opposite end sides of the housing, the input contacts being in the form of at least one terminal strip with insulation displacement contacts, the input and output contacts being releasably connected to the printed circuit board, the insulation displacement contacts being connected to the printed circuit board via fork contacts, and the connection between the front panel part and the housing being designed in such a way that, when the connection is released, the terminal strip, which is connected to the front panel part, with the fork contacts is moved away from the printed circuit board, the housing being formed with a stop, the printed circuit board, in the inserted state, lying with its end side associated with the input contacts behind the stop. The housing is preferably made from metal, the cover and the base part being formed from sheet spring steel, with ring contacts being arranged thereon in order to latch the distribution board connection module onto round bars.

SUMMARY

The invention is based on the technical problem of providing a less expensive distribution board connection module for telecommunications and data technology and a grounding clip suitable therefor.

In this regard, the distribution board connection module comprises a trough which is in the form of a U in cross section and modules, the trough being made from metal or metalized plastic and having a base plate and two limbs, the base plate having openings, into which first printed circuit board plug-type connectors are inserted, the modules each having a plastic housing, which has a cavity, in which at least one printed circuit board is arranged, the plastic housing having, on its front end side, an opening in which at least one printed circuit board plug-type connector is arranged and having, on its rear end side, an opening, the modules being plugged onto the limbs of the trough and a printed circuit board plug-type connector, which is inserted into the base plate of the trough, engaging in the opening of the rear end side of a plugged-on module and making contact with the printed circuit board of the module. As a result, the distribution board connection module can be manufactured at lower cost since the metal housings are considerably more expensive. A further advantage of the distribution board connection module according to the invention is the extension thereof as required. Thus, for example, the trough with printed circuit board plug-type connectors can be arranged on a rack, the printed circuit board plug-type connectors already being connected to prefabricated cables. Depending on the requirements of the subscriber, individual modules can then be plugged on until the trough is completely populated. Preferably, the printed circuit board plug-type connectors are formed with contact elements, which have a wire connection contact and a printed circuit board contact, the latter preferably being in the form of a fork contact. The wire connection contacts are preferably in the form of insulation displacement contacts or in the form of wire wrap contacts. In principle, other types of contacts are also conceivable, such as RJ45 plug-type connectors, for example. Functional elements such as XDSL assemblies, for example, are preferably arranged on the printed circuit board. In the case of XDSL assemblies, the number of contacts of the printed circuit board plug-type connector(s) in the front end side is then preferably twice as large as the number in the rear end side or in the openings of the base plate.

In a preferred embodiment, the trough which is in the form of a U in cross section has in each case a further inner limb, which each have sprung lugs, and thus additionally clamp the plugged-on modules in a sprung manner.

In a further preferred embodiment, at least one grounding clip is arranged in at least one module, with preferably two grounding clips being used per module.

Preferably, the grounding clip has at least one first contact for making contact with a printed circuit board and at least one second contact for making external contact with a carrier and/or the trough.

Preferably, the first contacts have two fork contacts and/or the second contacts have two fork contacts. In this case, the second fork contacts are used for making contact with the limbs of the trough, which are both plugged onto the limbs. The two first fork contacts mean that the same grounding clip is used both on the left-hand side and on the right-hand side in the module, with in each case only one of the two fork contacts making contact with the printed circuit board.

Further preferably, the second contacts have two ring contacts, by means of which the distribution board connection module or the modules can be latched onto round bars.

In a further preferred embodiment, accommodating means for fastening means, by means of which the distribution board connection module can be fastened to rails, are arranged on the outer sides of the outer limbs of the trough.

In a further preferred embodiment, sprung brackets, which are guided laterally past the outer limbs of the trough and are used for fastening on bay-type rails, are arranged on the lower side of the base plate of the trough.

The grounding clip according to the invention for a module comprises two first fork contacts and two second ring and/or fork contacts, the two first fork contacts being arranged next to one another in a plane, and the two ring and/or fork contacts being arranged in parallel planes.

The invention will be explained in more detail below with reference to a preferred exemplary embodiment. In the figures:

BRIEF DESCRIPTION OF THE DRAWINGS

FIG. 1 shows a perspective view from below of a housing upper shell of a module, FIG. 2 shows a perspective plan view of a housing lower shell of a module.

DETAILED DESCRIPTION

Figure 3:
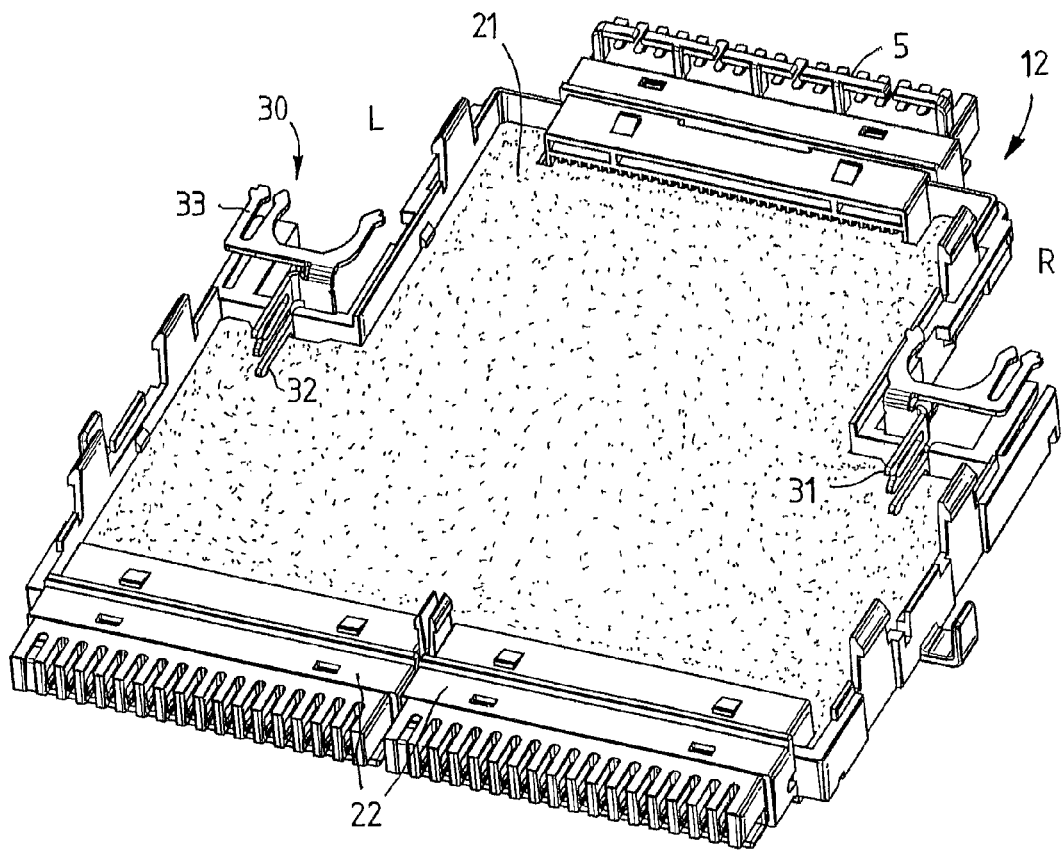
FIG. 3 shows a perspective plan view of the housing lower shell with the printed circuit board and grounding clip inserted.
Figure 4:
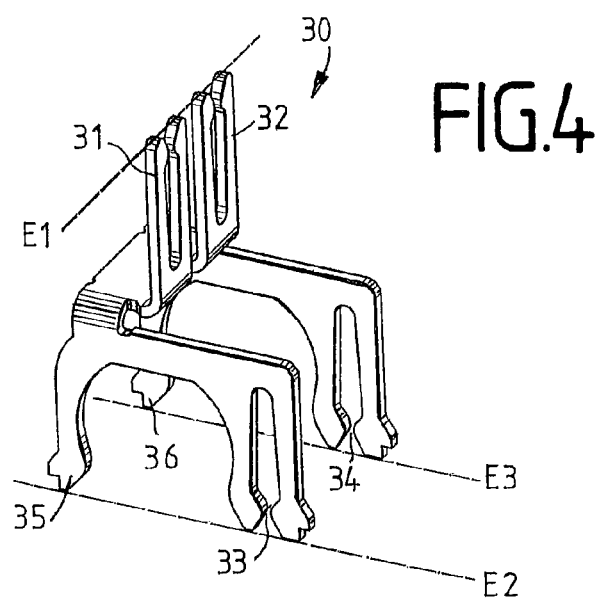
FIG. 4 shows a perspective illustration of a grounding clip.
Figure 5:
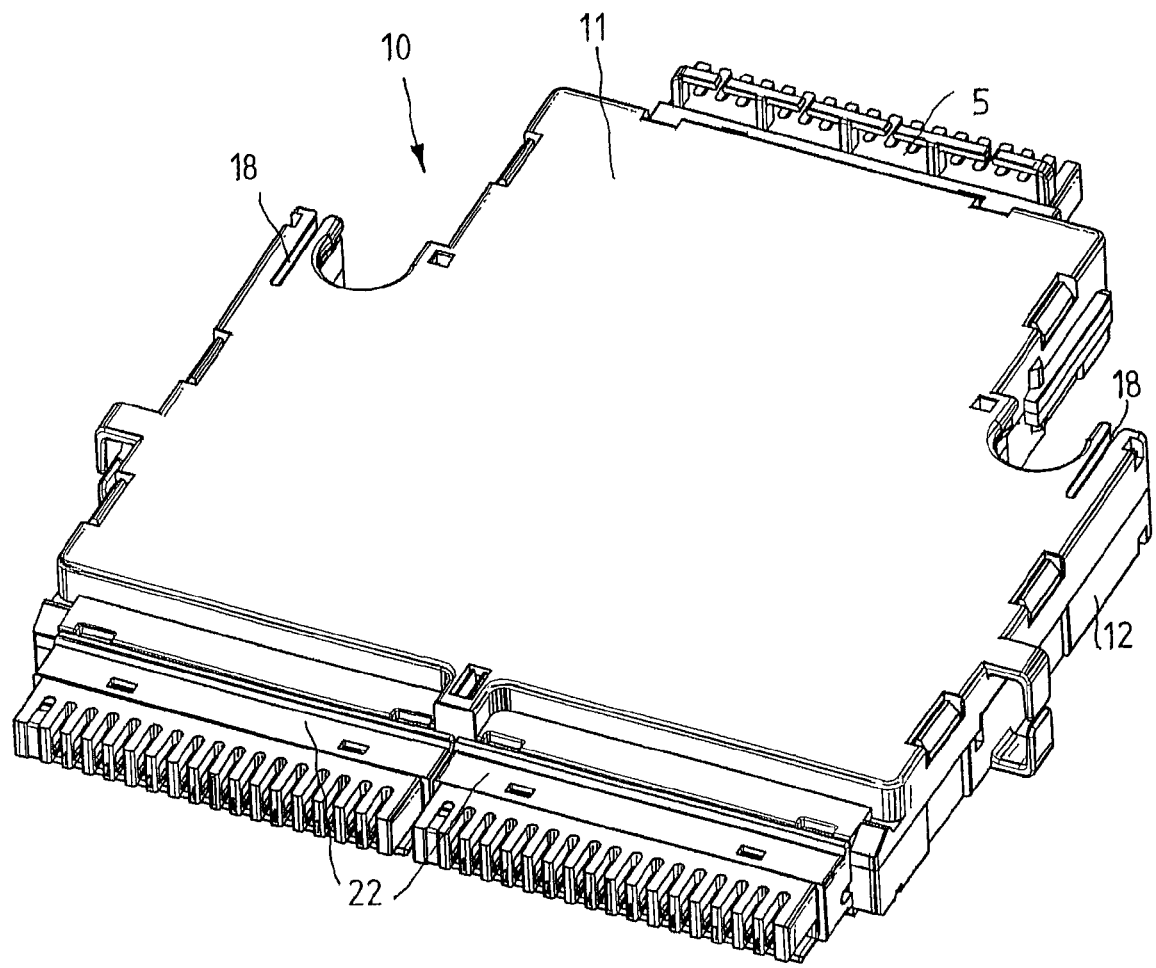
FIG. 5 shows a perspective plan view of an assembled module.

First the design of a module 10 will be explained in more detail with reference to FIGS. 1 to 5. The module 10 comprises a housing upper shell 11 (see FIG. 1) and a housing lower shell 12 (see FIG. 2), which are both formed from plastic. The front end sides 13, 14 in this case have in each case a greater width $B_V$ than the width $B_H$ of the rear end sides 15, 16. For this purpose, the side faces S of the housing shells 11, 12 are each bent back twice at right angles. A web 17 with a slit 18 is arranged on the respective side part S1, which is parallel to the end sides 13-16. Furthermore, the side part S1 has in each case one slit 19. The housing lower shell 12 has various latching means 20, which then make it possible, with associated opposing latching means of the housing upper shell 11, for the housing upper shell 11 and the housing lower shell 12 to be latched together. Then, a printed circuit board 21 with two 8-twin-wire printed circuit board plug-type connectors 22 is inserted into the housing lower shell 12 (see FIG. 3). The printed circuit board plug-type connectors 22 have contact elements, which have a printed circuit board contact in the form of a fork contact and a wire connection contact in the form of an insulation displacement contact, the latter being accessible from the front end side 14. Furthermore, two grounding clips 30 are inserted. The grounding clip 30 has two first fork contacts 31, 32, which lie next to one another in a plane E1 (see FIG. 4). Furthermore, the grounding clip 30 has two second fork contacts 33, 34, which lie parallel to one another in planes E2, E3, which lie perpendicular to the plane E1. Furthermore, the grounding clip 30 has two ring contacts 35, 36, which likewise lie in the planes E2, E3, the inner limbs 37, 38 of the second fork contacts 33, 34 at the same time forming a limb of the ring contacts 35, 36. Owing to the configuration of the grounding clip 30, the latter can be inserted both into the left side part and into the right side part S1, with the fork contact 32 making contact with the printed circuit board 21 on the left L and the fork contact 31 making contact with the printed circuit board 21 on the right R. For this purpose, the grounding clip 30 is simply rotated such that in each case the fork contacts 33, 34 are aligned toward the outer side. The fork contacts 31, 32 are in the process plugged through the slits 19. In this case, the slits of the fork contacts 33, 34 are then aligned with the slits 18 of the webs 17. Finally, the housing lower shell 12 and the housing upper shell 11 are latched to one another (see FIG. 5). Owing to the cutouts in the rear end side 15, 16, an opening in the rear end side of the module 10 is then formed.

Figure 6:
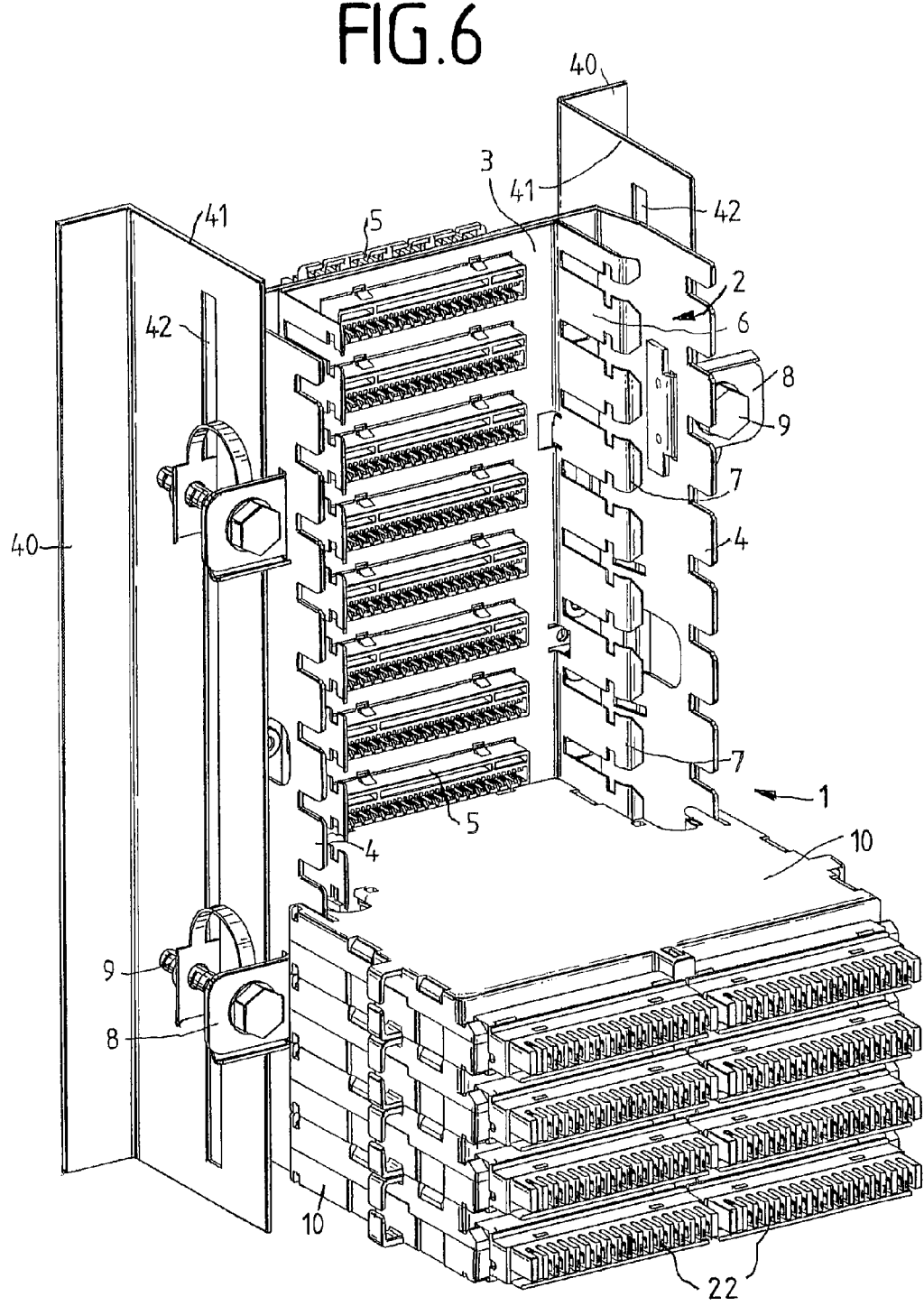
FIG. 6 shows a perspective front view of a distribution board connection module on mounting rails.
Figure 7:
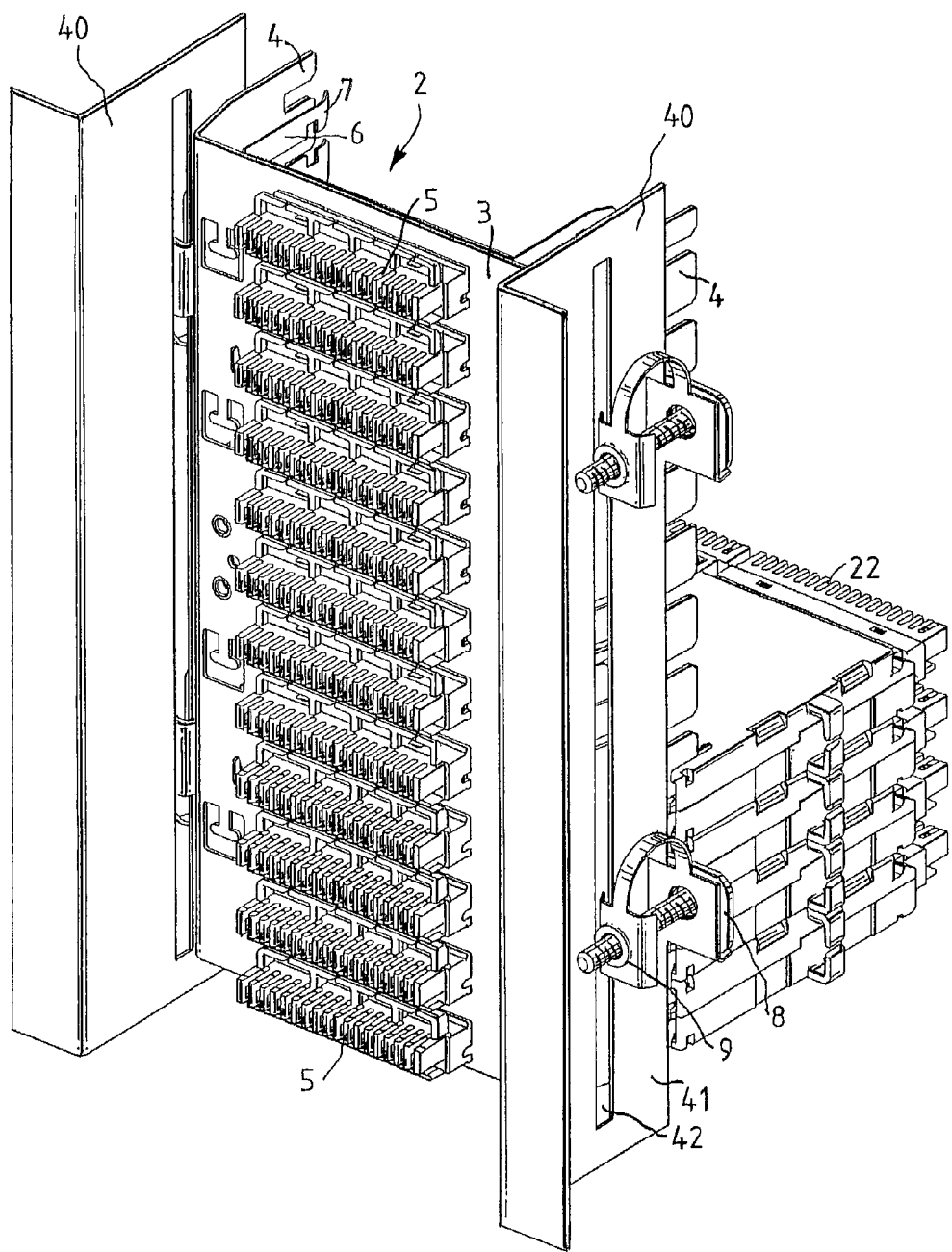
FIG. 7 shows a perspective rear view of the distribution board connection module as shown in FIG. 6.
Figure 8:
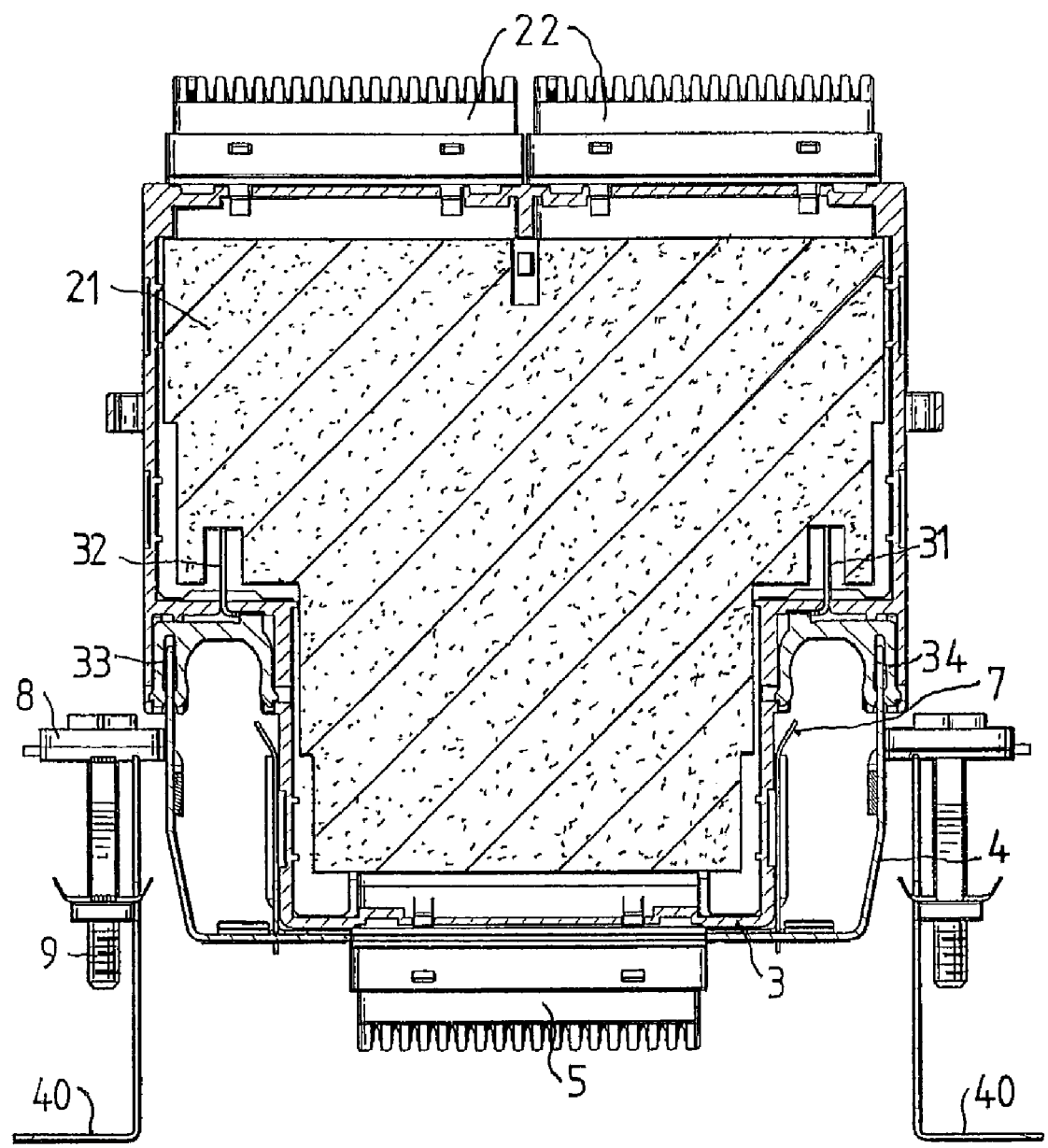
FIG. 8 shows a sectional illustration of the distribution board connection module as shown in FIGS. 6 and 7, with the section passing through the uppermost module.

FIGS. 6 to 8 illustrate a distribution board connection module 1, which is fastened on two rails 40. In this case, the rails 40 are L-shaped in cross section, the longer limb 41 having a slit 42. The distribution board connection module 1 has a trough 2 which is in the form of a U in cross section and is made from metal, with a base plate 3 and two limbs 4. The base plate 3 has openings, into which printed circuit board plug-type connectors 5 are inserted. The trough 2 has in each case one further inner limb 6. These inner limbs 6 in turn have sprung lugs 7. The outer limbs 4 have accommodating means 8 for fastening means 9 in order to fasten the distribution board connection module 1 onto the rails 40. In the example illustrated, four modules 10 are plugged onto the trough 2. For this purpose, the modules 10 are plugged with the slits 18 onto the outer limbs 4, with at the same time the fork contacts 33, 34 thereby making contact with the outer limbs 4 and thus producing a grounding connection with the rails 40 via the trough 2 and then via the fastening means 9. Furthermore, the lugs 7 spring against the side faces S of the modules 10, which are thus additionally fixed. It furthermore becomes clear here that the distribution board connection module 1 can be extended very easily and can be extended by modules 10, as required.

Figure 9:
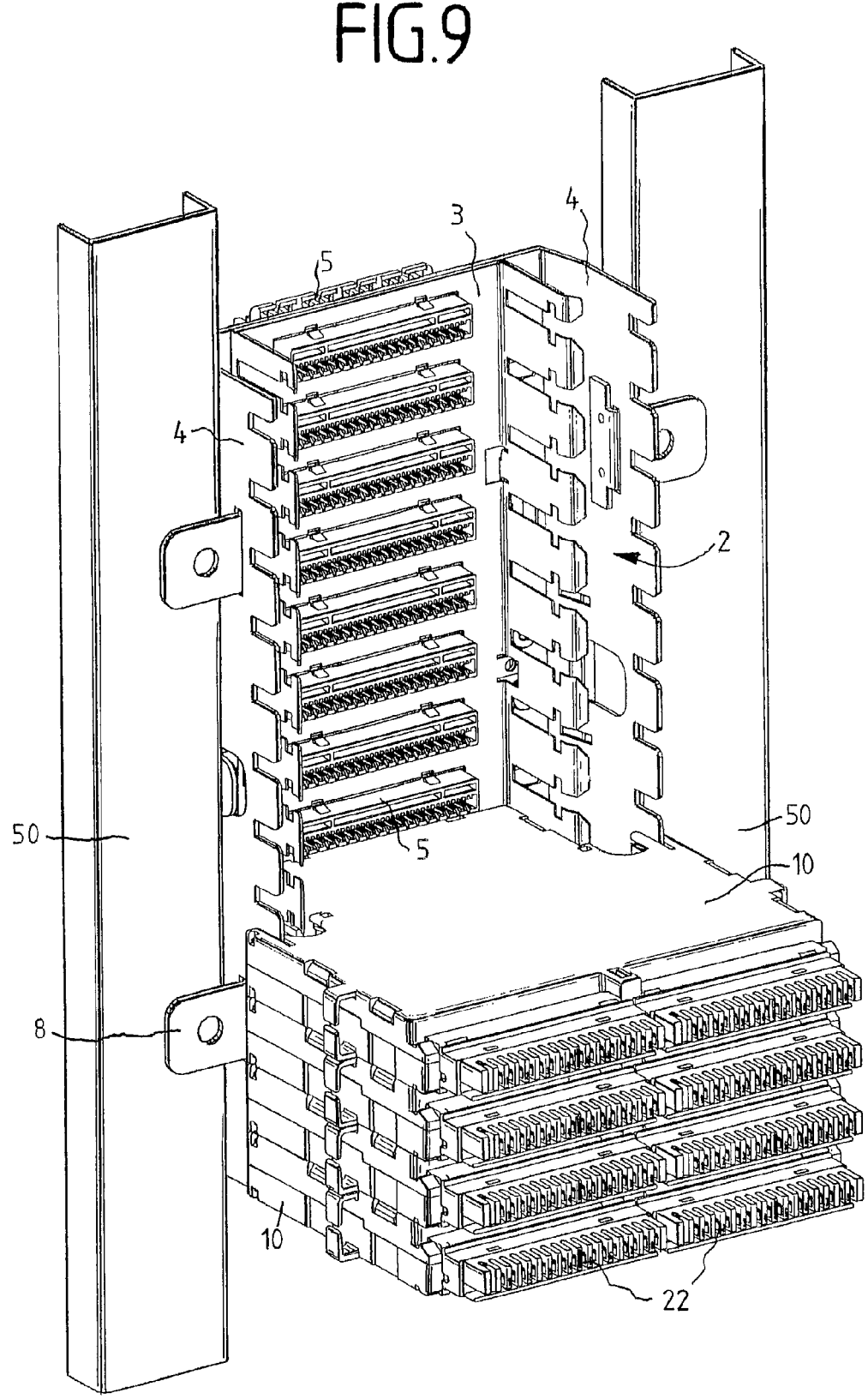
FIG. 9 shows a perspective front view of a distribution board connection module on bay-type rails.
Figure 10:
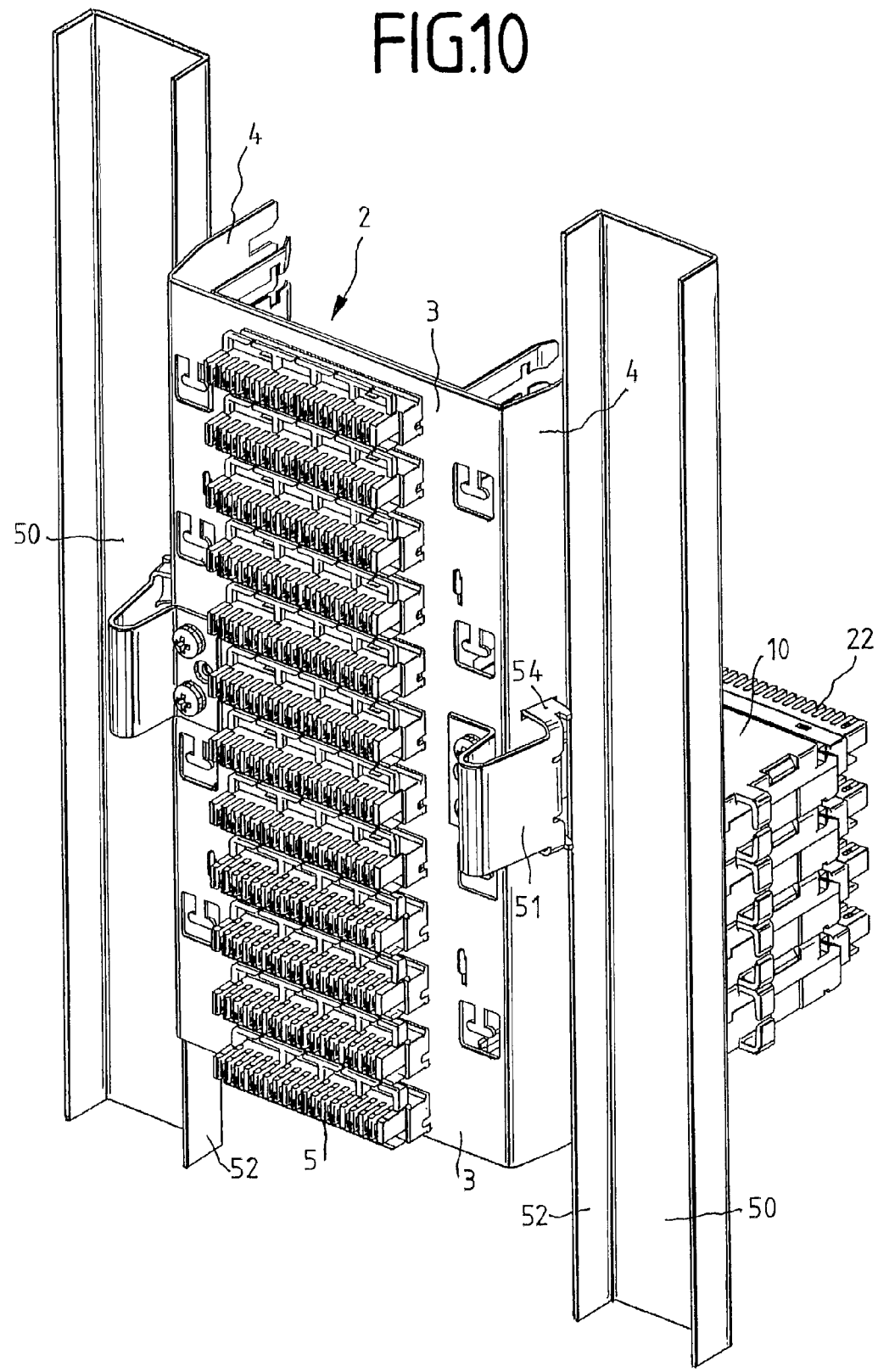
FIG. 10 shows a perspective rear view of the distribution board connection module as shown in FIG. 9.
Figure 11:
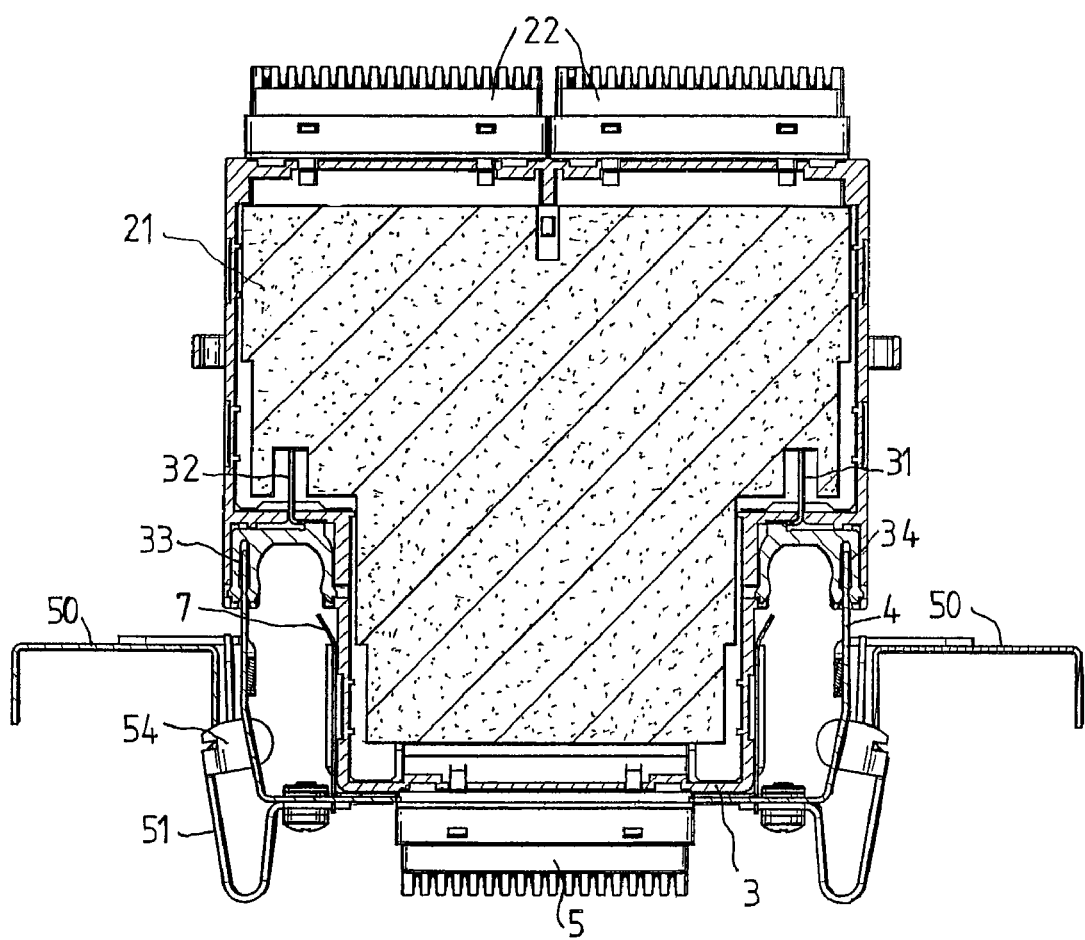
FIG. 11 shows a sectional illustration of the distribution board connection module as shown in FIGS. 9 and 10, with the section passing through the uppermost module.

In FIGS. 9 to 11, the distribution board connection module 1 is alternatively fastened on bay-type rails 50, the bay-type rails 50 having a U-shaped cross section. In contrast to the exemplary embodiment shown in FIGS. 6 to 8, sprung brackets 51 are screwed onto the base plate 3 of the trough 2. The sprung brackets 51 can spring into the outer limbs 4 with lugs 54 through slits (see also FIG. 11). If the trough 2 is then pressed from the front side between the bay-type rails 50, the brackets 51 or lugs 54 first of all spring in, in order then to be relieved of strain behind the limbs 52 of the bay-type rails 50, with the result that the trough 2 is clamped in a sprung manner against the bay-type rails 50.

LIST OF REFERENCE SYMBOLS

1 Distribution board connection module
2 Trough
3 Base plate
4 Outer limbs
5 Printed circuit board plug-type connector
6 Inner limbs
7 Lugs
8 Accommodating means
9 Fastening means
10 Module
11 Housing upper shell
12 Housing lower shell
13, 14 Front end sides
15, 16 Rear end sides
17 Web
18 Slit
19 Slit
20 Latching means
21 Printed circuit board
22 Printed circuit board plug-type connector
30 Grounding clip
31, 32 First fork contacts
33, 34 Second fork contacts
35, 36 Ring contacts
37, 38 Inner limbs
40 Rails
41 Limbs
42 Slit
50 Bay-type rails
51 Bracket
52 Limbs
54 Lugs
L Left
R Right
S Side face
S1 Side part
E1, E2, E3 Planes

The invention claimed is:

1. A distribution board connection arrangement for telecommunications and data technology, comprising:
    a plurality of modules each including a housing enclosing a printed circuit board, the housing extending from a front to a rear, each module having an opening defined at the rear of the housing, the opening leading to the printed circuit board of the housing, and each module having a plurality of second plug-type connectors coupled to the respective printed circuit board at the front of the housing;
    a trough having a U-shaped cross section, the trough being made from metal or metalized plastic and having a base plate, two outer limbs, and two inner limbs, each of the inner limbs including a sprung lug, the base plate having openings through which a plurality of first printed circuit board plug-type connectors extend;
    wherein the modules are plugged onto the limbs of the trough so that each module receives one of the first printed circuit board plug-type connectors through the opening defined at the rear of the module, wherein each of the first printed circuit board plug-type connectors that is received at one of the modules is plugged onto the respective printed circuit board of the module.

2. The distribution board connection arrangement as claimed in claim 1, wherein at least one grounding clip is arranged in at least one of the modules.

3. The distribution board connection arrangement as claimed in claim 2, wherein the grounding clip has at least one first contact for making contact with a printed circuit board and at least one second contact for making external contact with a carrier and/or the trough.

4. The distribution board connection arrangement as claimed in claim 3, wherein the first contacts have two fork contacts and/or the second contacts have two fork contacts.

5. The distribution board connection arrangement as claimed in claim 3, wherein the second contacts have two ring contacts.

6. The distribution board connection arrangement as claimed in claim 1, wherein accommodating means for fastening means are arranged on outer sides of the outer limbs of the trough.

7. The distribution board connection arrangement as claimed in claim 1, wherein sprung brackets, which have lugs that are guided laterally through the outer limbs, are arranged on the base plate of the trough.

8. The distribution board connection arrangement as claimed in claim 2, wherein the grounding clip, comprises:
    two first fork contacts and two ring contacts and two second fork contacts, the two first fork contacts being arranged one after the other in a plane, and the two ring contacts and the two second fork contacts being arranged in parallel planes.

9. A distribution board connection arrangement for telecommunications and data technology, comprising:
    a plurality of modules each including housing enclosing a printed circuit board, the housing extending from a first end to a second end, each module having an opening leading to the respective printed circuit board defined at the first end of the housing and each module having a plurality of second plug-type connectors coupled to the respective printed circuit board at the second end of the housing; and
    a trough having a U-shaped cross section, the trough being made from metal or metalized plastic and having a base plate, two inner limbs and two outer limbs, the base plate having openings through which a plurality of first printed circuit board plug-type connectors extend, the outer limbs including accommodating means for fastening means arranged on outer sides of the outer limbs;
    wherein the modules are plugged onto the limbs of the trough so that each module receives one of the first printed circuit board plug-type connectors through the opening defined at the first end of one of the modules, each of the first printed circuit board plug-type connectors received at one of the modules being plugged onto the respective printed circuit board of the module.

10. A distribution board connection arrangement for telecommunications and data technology, comprising:
    a plurality of modules each including housing enclosing a printed circuit board, the housing extending from a first end to a second end, each module having an opening leading to the respective printed circuit board defined at the first end of the housing and each module having a plurality of second plug-type connectors coupled to the respective printed circuit board at the second end of the housing;
    a trough having a U-shaped cross section, the trough being made from metal or metalized plastic and having a base plate, two inner limbs and two outer limbs, the base plate having openings through which a plurality of first printed circuit board plug-type connectors extend;
    wherein the modules are plugged onto the limbs of the trough so that each module receives one of the first printed circuit board plug-type connectors through the opening defined at the first end of one of the modules, each of the first printed circuit board plug-type connectors received at one of the modules being plugged onto the respective printed circuit board of the module;
    wherein sprung brackets, which extend beyond past the outer limbs, are arranged on of the base plate of the trough.

* * * * *